Jan. 25, 1949. J. A. OPENSHAW 2,460,235
WIRE TWISTING APPARATUS
Filed Dec. 23, 1946

Inventor
James A. Openshaw
By Walter C. Ross
Attorney

Patented Jan. 25, 1949

2,460,235

UNITED STATES PATENT OFFICE 2,460,235

WIRE TWISTING APPARATUS

James A. Openshaw, Southampton, Mass., assignor to Stanley Home Products, Inc., Westfield, Mass., a corporation of Massachusetts Application December 23, 1946, Serial No. 717,861

2 Claims. (Cl. 279—1)

This invention relates to improvements in wire twisting apparatus.

The principal object of the invention is the provision of rotatable wire twisting apparatus which is particularly adapted for clamping end portions of wires for twisting them in a brush forming operation.

Figure 1:
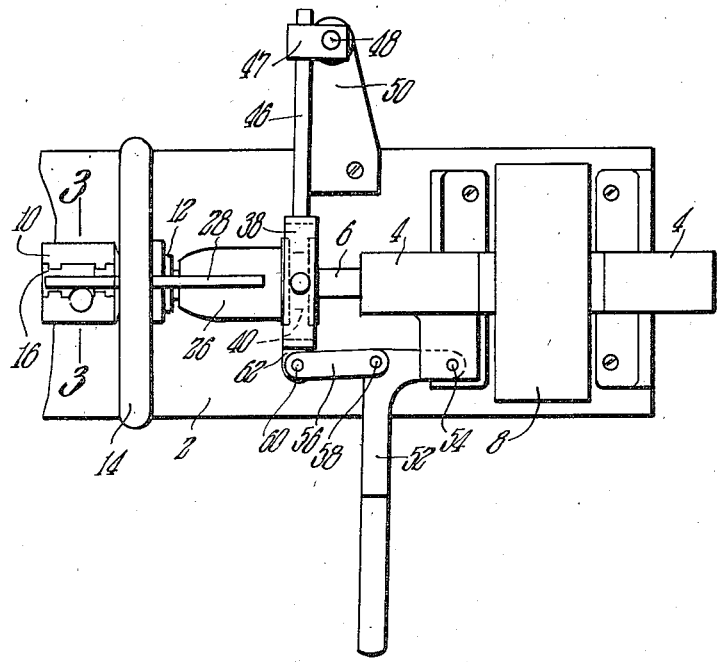
Figure 2:
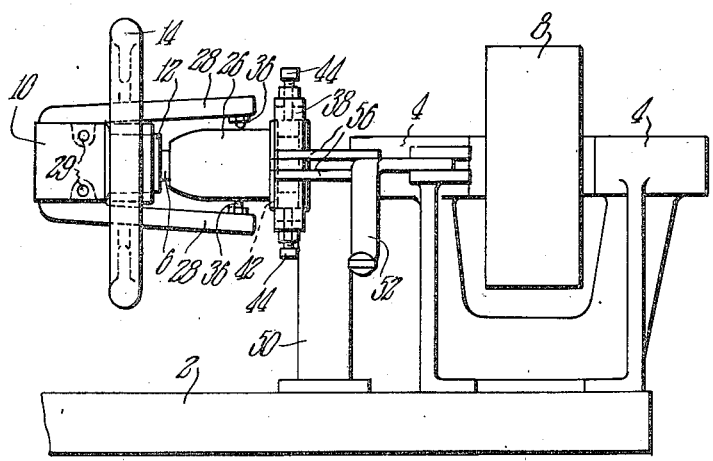
Figure 3:
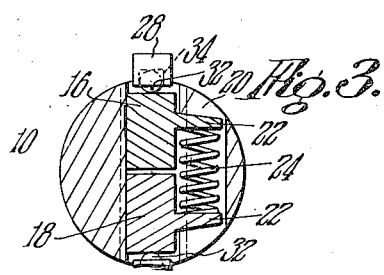

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figs. 1 and 2 are plan and side elevational views of wire twisting apparatus embodying the novel features of the invention; and Fig. 3 is a sectional elevational view on the line 3—3 of Fig. 1.

Referring now to the drawings more in detail, the invention will be fully described.

A support is represented by 2 which has fixed thereto bearings 4 in which is rotatable a shaft 6. A pulley 8 is fixed to the shaft 6 which may be connected in the usual manner to a suitable source of power.

A chuck 10 has a hub 12 fixed to the shaft 6 and a hand-wheel 14 is fixed to said hub.

Said chuck is slotted radially and upper and lower jaws 16 and 18 therein have on their opposite sides keys and grooves which interfit keys and grooves in the side faces of the slot as shown in Fig. 1. In this way the jaws are movable radially of the chuck between an inner wire clamping and an outer releasing position.

The adjacent inner faces of the jaws 16 and 18 may be serrated or roughened for gripping end portions of wires.

The chuck 10 has a bore 20 extending at a side of and transversely of its longitudinal axis and the jaws are provided with outwardly ending ledges 22 which are disposed in said bore. A spring 24 is disposed between the ledges and urges the jaws apart to non-clamping position.

A cam 26 is slidable on the shaft 6 and has a conical forward end. Levers 28 are pivoted in the clutch at 29 and have balls 32 in sockets 34 at the outer forward ends which balls bear on the jaws 16 and 18.

Screw-like members 36 are in threaded engagement with the inner ends of the levers 28 and are engageable by the cam.

As the cam moves away from the chuck the levers swing inwardly the spring 24 acting on the jaws moves them to non-clamping position. When the cam moves towards the chuck the levers are spread apart so as to move and hold the jaws in wire clamping position.

A ring 38 surrounds the rear part of the cam which is provided with an annular groove 40. Shoes 42 in said groove are associated with screws 44 which extend through the ring 38.

An extension 46 extends from the ring 38 and has a part 47 secured thereto which is pivoted on a stud 48 carried by a bracket 50 fixed to the support 2.

An operating lever 52 is pivoted at 54 to the bearing construction and a link 56 has opposite ends pivotally connected at 58 and 60 to the lever 52 and to an ear 62 of the ring 38.

The lever 52 may be swung in opposite directions so as to move the cam towards and away from the chuck thereby to separate levers 28 which will move the jaws to wire clamping position or to allow the levers to swing inwardly as the jaws are separated by the spring.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Wire twisting apparatus comprising in combination, bearing means, a shaft rotatable therein, a chuck fixed on said shaft having a slot therethrough disposed transversely to the longitudinal axis thereof, jaws slidable in said slot radially of said chuck, separating means urging said jaws apart, levers pivoted in said chuck, bearing means at the forward ends of said levers bearing on outer sides of said jaws, a cam slidable on said shaft adapted to act on and separate said levers when moved towards said chuck, and means to actuate said cam, said separating means including ledges projecting from a side of said jaws disposed in a bore provided in said chuck and a spring between said ledges, and said bearing means including sockets provided in said levers and balls disposed therein.

2. Wire twisting apparatus comprising in combination, bearing means, a shaft rotatable therein, a chuck fixed on said shaft having a slot therethrough disposed transversely to the longitudinal axis thereof, jaws slidable in said slot radially of said chuck and towards and away from one another, separating means urging said jaws away from one another, levers pivoted in said chuck, bearing means at forward ends of said levers bearing on outer sides of said jaws, a cam slidable on said shaft adapted to act on rear ends of said levers to separate them when moved towards said chuck, and means to actuate said cam, said separating means including ledges projecting from a side of said jaws disposed in a bore provided in said chuck and a spring between said ledges, and said bearing means including sockets provided in said levers and balls disposed therein.

JAMES A. OPENSHAW.

REFERENCES CITED

The following references are of record in the file of this patent:

UNITED STATES PATENTS

| Number | Name | Date |
| --- | --- | --- |
| 56,330 | Smith | July 10, 1866 |
| 828,695 | Wellington | Aug. 14, 1906 |
| 1,699,358 | Hay | Jan. 15, 1929 |

FOREIGN PATENTS

| Number | Country | Date |
| --- | --- | --- |
| 18,916 | Great Britain | Sept. 20, 1899 |